United States Patent [19]

Peregrim et al.

[11] Patent Number: 4,837,577
[45] Date of Patent: Jun. 6, 1989

[54] METHOD FOR STABILIZING AN ELECTRONICALLY STEERED MONOPULSE ANTENNA

[75] Inventors: Theadore J. Peregrim, Bedford; Frank A. Okurowski, Concord; Rosario Mangiapane, Clelmsford, all of Mass.

[73] Assignee: Raytheon Company, Lexington, Mass.

[21] Appl. No.: 194,618

[22] Filed: May 16, 1988

[51] Int. Cl.[4] .................. G01S 13/44; G01S 13/89
[52] U.S. Cl. ..................................... 342/80; 342/25; 342/154; 342/175
[58] Field of Search ............... 342/74, 75, 76, 80, 342/81, 154, 158, 175, 25, 149

[56] References Cited

U.S. PATENT DOCUMENTS

| | | |
|---|---|---|
| 3,680,086 | 7/1972 | Valstar . |
| 3,924,235 | 12/1975 | Heller et al. . |
| 4,179,696 | 12/1979 | Quesinberry et al. . |
| 4,194,204 | 3/1980 | Alpers . |
| 4,665,401 | 5/1987 | Garrard et al. ................ 342/0 |

Primary Examiner—Thomas H. Tarcza
Assistant Examiner—Mark Hellner
Attorney, Agent, or Firm—Edmund J. Walsh; Richard M. Sharkansky

[57] ABSTRACT

A method of electronically stabilizing a monopulse antenna mounted on a movable body is disclosed. According to the disclosed invention, the monopulse antenna is electronically steered in a fixed direction despite motion of the movable body in relation to that direction. Compensated azimuthal and elevation difference signals are formed by approximately weighting and adding the the uncompensated azimuthal and elevation difference signals formed by the monopulse antenna.

4 Claims, 6 Drawing Sheets

METHOD FOR STABILIZING AN ELECTRONICALLY STEERED MONOPULSE ANTENNA

This invention was made with Government support under Contract No. F33615-83-C-1128 awarded by the Department of the Army. The Government has certain rights in this invention.

BACKGROUND OF THE INVENTION

This invention relates generally to stabilizing an antenna mounted on a movable object, and more particularly to the stabilization of an electronically steered monopulse antenna.

In many applications it is important for an antenna on a movable object to be pointed in a particular direction, i.e., be stabilized. In one important class of systems the movable object is an aircraft and the fixed direction is measured in relation to obfects on the ground. For example, a synthetic aperture radar (SAR) on an aircraft transmits radar pulses toward a particular point on the ground and processes the reflections from an illuminated area around the particular point. Because wind or other forces may cause the aircraft to roll, pitch and yaw, the antenna of the radar must be movable relative to the aircraft to keep the centerline of the radar beam in coincidence with the particular point on the ground.

One method of stabilizing an antenna requires that the antenna be mounted on a platfor, often called "gimbals," which may be moved relative to the aircraft as required to keep the centerline of the beam fixed in space. Thus, an inertial navigation system (also called INS) in the aircraft may include gyroscopic sensors which measure the roll, pitch and yaw of the aircraft. Based on such measurements, a required movement of the gimbals to keep the beam of the antenna pointed toward a desired point on the ground is computed and the gimbals are then caused to be moved accordingly.

A major drawback of such a system for stabilizing an antenna is that gimbals which may move an antenna to compensate for roll, pitch and yaw of the aircraft must have three degrees of freedom of motion. Such gimbals are mechanically complex. A simpler gimbal with one less degree of freedom could be used with an antenna mounted so as to be insensitive to rotation around one axis. In other words, an antenna which receives the same signal regardless of how it is rotated about a particular axis does not need to be moved about that axis to compensate for motion of the aircraft about that axis.

As is known, when the beam from an array antenna is electronically steered, the antenna itself is not physically moved. Instead, the antenna elements making up an array antenna are controlled so as to change the direction of the centerline of the beam from such antenna. Thus, electronic control signals to the antenna produce the same result as physically moving the antenna on gimbals so that there is no need for mechanical motion of an array antenna to accomplish stabilization.

Planar phased array antennas have been used to stabilize antennas on aircraft because they can be electronically steered to compensate for motion of the aircraft in two directions—pitch and yaw, for example. Additionally, phased array antennas may be constructed to be insensitive to rotation in a third direction—roll, for example. In such systems, no mechanical gimbal is needed at all. The antenna may be stabilized fully by electronic steering.

However, not all planar phased array antennas are insensitive to rotation. Monopulse antennas, when formed from planar phased array antennas, are sensitive to rotation. Because monopulse antenna systems provide important advantages in many cases, planar phased array monopulse antennas are often mounted on a gimbal which moves with one degree of freedom. The antenna is thus stabilized by electronically steering the antenna in two directions and physically moving it in a third. For example, the antenna would be electronically steered to compensate for pitch and yaw of the aircraft and mounted on a gimbal with one degree of rotational freedom to compensate for roll. Gimbals with one degree of rotational freedom are simpler to construct than those with two or three degrees of freedom. However, it would be desirable to stabilize a monopulse antenna without requiring any mechanical motion.

SUMMARY OF THE INVENTION

It is an object of this invention to provide a method of stabilizing a monopulse antenna on a movable body without mechanically moving the antenna relative to the movable body.

It is also an object of this invention to provide a method of stabilizing a monopulse antenna on a movable body by electronically steering the beam from such an antenna and processing the received signals.

The foregoing and other objects of the invention are accomplished by electronically steering the beam from a monopulse antenna mounted on a movable body to compensate for motion of the movable body in two directions and by computing a compensated azimuthal difference signal and a compensated elevation difference signal. The compensated difference signals are computed by forming weighted combinations of the uncompensated difference signals wherein the weighting of the uncompensated difference signals is determined based on the motion of the movable body.

BRIEF DESCRIPTION OF THE DRAWINGS

The invention will be more fully understood by the following description and drawings wherein.

DESCRIPTION OF THE PREFERRED EMBODIMENT

Figure 1:
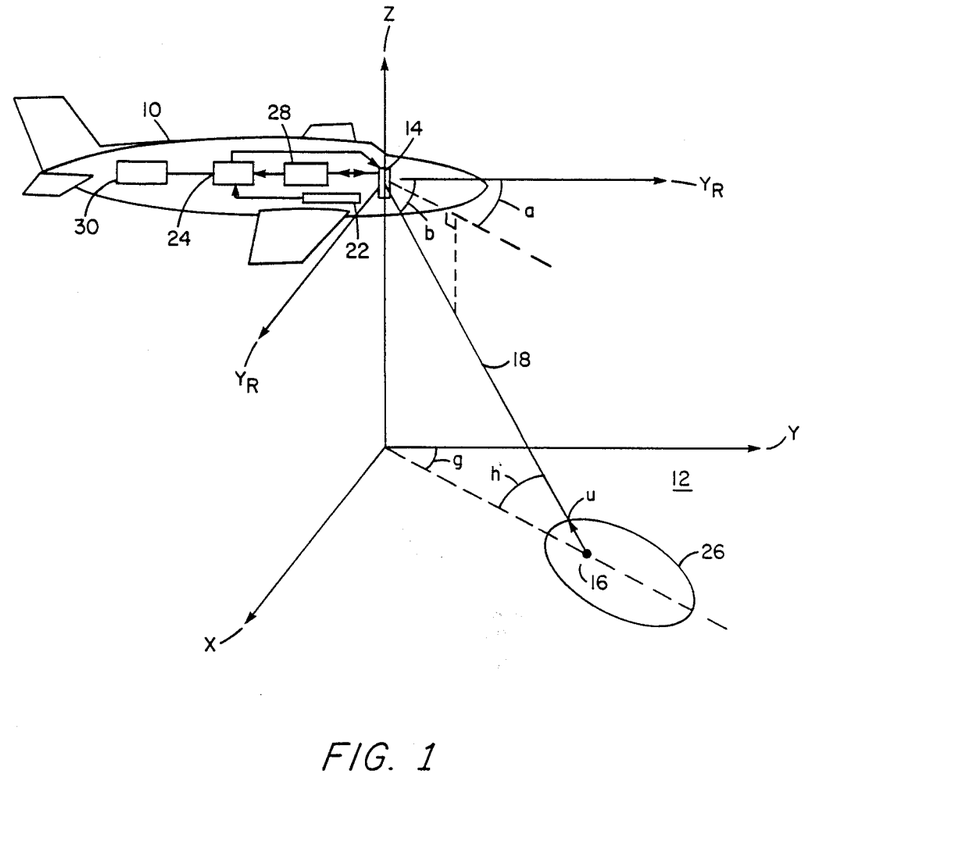
FIG. 1 is a simplified sketch showing the geometrical relationships between objects on the ground and an aircraft carrying a monopulse antenna stabilized according to the present invention.

FIG. 1 shows a monopulse antenna 14 mounted on a movable body, as aircraft 10. Here the monopulse antenna 14 is an electronically steerable phased array of known construction and is operated so that monopulse antenna 14 transmits and receives signals in a beam (not shown) having a centerline in the direction of line 18. As depicted in FIG. 1, monopulse antenna 14 forms a portion of a synthetic aperture radar (SAR) with line 18 extending from aircraft 10 to a particular position on the ground 12. To form a SAR map, radar pulses formed by radar electronics 28 are first transmitted in a beam (not shown) in the direction of line 18. The beam intersects the ground 12 to create beam coverage area 26. Points within beam coverage area 26 reflect radar pulses to be received at monopulse antenna 14. The reflected pulses are demodulated and amplified in a known way by radar electronics 28. As is known, the reflected pulses received by monopulse antenna 14 are first processed to form form three signals: A sum signal, an azimuthal difference signal and an elevation difference signal. Such three signals are then processed by motion compensator 24 which, in a manner described in greater detail below, produces a compensated azimuthal difference signal and a compensated elevation signal neither of which is sensitive to the roll of aircraft 10 about axis $Y_R$. Motion compensator 24 also computes commands for monopulse antenna 14 to keep the centerline of the antenna steered in the direction of line 18. For reasons explained in greater detail below, the compensated signals closely approximate the signals which would have been received if monopulse antenna 14 were stabilized by mechanical motion with three degrees of freedom. The compensated signals are fed to SAR processor 30 which is of known construction.

For convenience, a Cartesian coordinate system with X, Y and Z axes is shown in FIG. 1. The ground 12 is deemed to be in the plane formed by the X and Y axes. The Y axis is the projection of the course line of the aircraft 10 and the X axis is perpendicular to the Y axis. The Z axis is perpendicular to the ground 12. Line 18 may be described in relation to the Cartesian coordinate system as forming a ground angle h with the ground 12 (i.e., the plane formed by the X and Y axes) and a ground angle g from the Y axis. For the purposes of describing the present invention, it will be assumed that line 18 is in a predetermined direction such that the ground angles g and h are known. One of skill in the art will recognize that the direction of line 18 will be chosen so that the beam of monopulse antenna 14 points at an area on the ground 12 to be represented in the SAR in operation. One of skill in the art will also recognize that the direction of line 18 may change during operation of the SAR, but such changes will not affect the operation of the invention as described herein.

Line 18 may also be described in relation to a coordinate system relative to aircraft 10, i.e., $X_R$, $Y_R$ and $Z_R$, (axis $Z_R$ is not shown but is coincident with the axis Z for the orientation of aircraft 10 shown). Line 18 is displaced by an angle a from axis $Y_R$ and is depressed by an angle b from the plane formed by axes $X_R$ and $Y_R$. Here, axis $Y_R$ is in the direction of travel of aircraft 10 and is parallel to the Y axis. Axis $Y_R$ also represents the direction in which monopulse antenna 14 would transmit or receive in the absence of any steering control signals applied to the elements of monopulse antenna 14. To make the centerline of the beam of monopulse antenna 14 coincident with direction along line 18, therefore, the beam of monopulse antenna 14 must be steered through the angle a from the axis $Y_R$ in the plane formed by $X_R$ and $Y_R$ and through the angle b in the plane orthogonal to the $X_R$, $Y_R$ plane. For this reason, the angles a and b will hereinafter also be referred to as steering angles. It is important to note that the beam from monopulse antenna 14 is steered relative to aircraft 10. In order to steer the beam from monopulse antenna 14 along line 18 (which makes angles g and h with respect to a Cartesian coordinate system relative to the ground 12) the steering angles a and b must be related to ground angles g and h.

For the position of aircraft 10 shown in FIG. 1, monopulse antenna 14 is in the plane formed by the $X_R$ and $Z_R$ axis with the antenna center on the $Y_R$ axis. Thus, steering angle a equals ground angle g and steering angle b equals ground angle h. However, the steering angles a and b will not equal the ground angles g and h for other orientations of aircraft 10. For example, if aircraft 10 were to pitch (i.e., rotate about an axis $X_R$), steering angle b would differ from ground angle h. Likewise, if aircraft 10 were to yaw (i.e., rotate about the Z axis), steering angle a would differ from ground angle g. If aircraft 10 were to rolll (i.e., rotate around axis $Y_R$), both steering angles a and b would deviate from ground angles g and h. Therefore, in order to stabilize the beam from monopulse antenna 14 in the direction along line 18, roll, pitch and yaw of aircraft 10 must be measured and steering angles a and b must be changed to compensate for the motion of aircraft 10.

Apparatus for measuring roll, pitch and yaw of aircraft is well known. Internal navigation system 22 (hereinafter INS 22) is such a known apparatus. Suffice it to say that INS 22 measures the roll, pitch and yaw of aircraft 10, for example by means of three orthogonally disposed gyroscopic sensors (not shown), to provide signals for a matrix C of elements that describes the relationship between the Cartesian coordinate system on the ground and the Cartesian coordinate system relative to aircraft 10. The matrix C is a 3X3 matrix having elements $C_{11}$, $C_{12}$, $C_{13}$, $C_{21}$, $C_{22}$, $C_{23}$, $C_{31}$, $C_{32}$, $C_{33}$ and satisfying the matrix equation $$\begin{bmatrix} u_{rx} \\ u_{ry} \\ u_{rz} \end{bmatrix} = \begin{bmatrix} C_{11} C_{12} C_{13} \\ C_{21} C_{22} C_{23} \\ C_{31} C_{32} C_{33} \end{bmatrix} \begin{bmatrix} u_x \\ u_y \\ u_z \end{bmatrix} \quad \text{Eq. (1)}$$

where $u_{rx}$, $u_{ry}$ and $u_{rz}$ are unit vectors (not shown) along the axes $X_R$, $Y_R$, $Z_R$ and $u_x$, $u_y$, $u_z$ are unit vectors (not shown) along the axes X, Y and Z. One of skill in the art will thus recognize that the matrix C is a translation matrix between coordinates relative to the aircraft and coordinates relative to the ground and that matrix C may be computed using known principles of linear algebra from the measurements of roll, pitch and yaw of aircraft 10.

The desired steering angles a and b may be computed from the desired ground angles g and h using the coordinate transformation matrix C. As is known from principles of linear algebra, an equation relating any vector expressed in terms of one coordinate system may be expressed in another coordinate system using a coordinate transformation matrix, such as matrix C. Therefore, an equation may be written relating a unit vector along line 18 expressed in terms of the Cartesian coordinate system relative to the ground 12 to the same unit vector expressed in terms of the cartesian coordinate system relative to aircraft 10:

$$\begin{bmatrix} \dfrac{\sin(a)\sin(b)}{\sqrt{\cos^2(b)+\cos^2(a)\sin^2(b)}} \\ \dfrac{\cos(a)\cos(b)}{\sqrt{\cos^2(b)+\cos^2(a)\sin^2(b)}} \\ \dfrac{-\cos(a)\sin(b)}{\sqrt{\cos^2(b)+\cos^2(a)\sin^2(b)}} \end{bmatrix} = \begin{bmatrix} C_{11}C_{12}C_{13} \\ C_{21}C_{22}C_{23} \\ C_{31}C_{32}C_{33} \end{bmatrix} \begin{bmatrix} \cos(h)\sin(g) \\ \cos(H)\cos(g) \\ -\sin(h) \end{bmatrix} \quad \text{Eq. (2)}$$

Eq. (2), when solved for steering angles a and b, yields two equations:

$$a = \tan^{-1}\left(\frac{C_{12}\cos(h)\sin(g)+C_{12}\cos(h)\cos(g)-C_{13}\sin(h)}{C_{21}\cos(h)\sin(g)+C_{22}\cos(h)\cos(g)-C_{23}\sin(h)}\right) \quad \text{Eq. (3)}$$

and $$b = \tan^{-1}\left(\frac{C_{31}\cos(h)\sin(g)+C_{31}\cos(h)\cos(g)-C_{33}\sin(h)}{C_{21}\cos(h)\sin(g)+C_{22}\cos(h)\cos(g)-C_{23}\sin(h)}\right) \quad \text{Eq. (4)}$$

Thus, as shown in FIG. 1, INS 22 measures roll, pitch and yaw of aircraft 10 and forms matrix C in a known manner. Matrix C, together with a representation of ground angles g and h, are provided to motion compensator 24. Here, motion compensator 24 is a general purpose digital computer programmed, using known techniques, to solve Eq. (3) and Eq. (4). The steering angles a and b computed by motion compensator 24 are provided as control inputs to monopulse antenna 14. Thus, the beam of monopulse antenna 14 is steered to point along line 18 as aircraft 10 rolls, pitches and yaws.

However, merely steering the beam of monopulse antenna 14 along line 18 does not fully compensate for roll, pitch and yaw of aircraft 10. As was noted above, monopulse antennas are not insensitive to rotation. The impact of rotation of monopulse antenna 14 on the received signals may be seen by reference to FIGS. 2A and 2B.

Figure 2A:
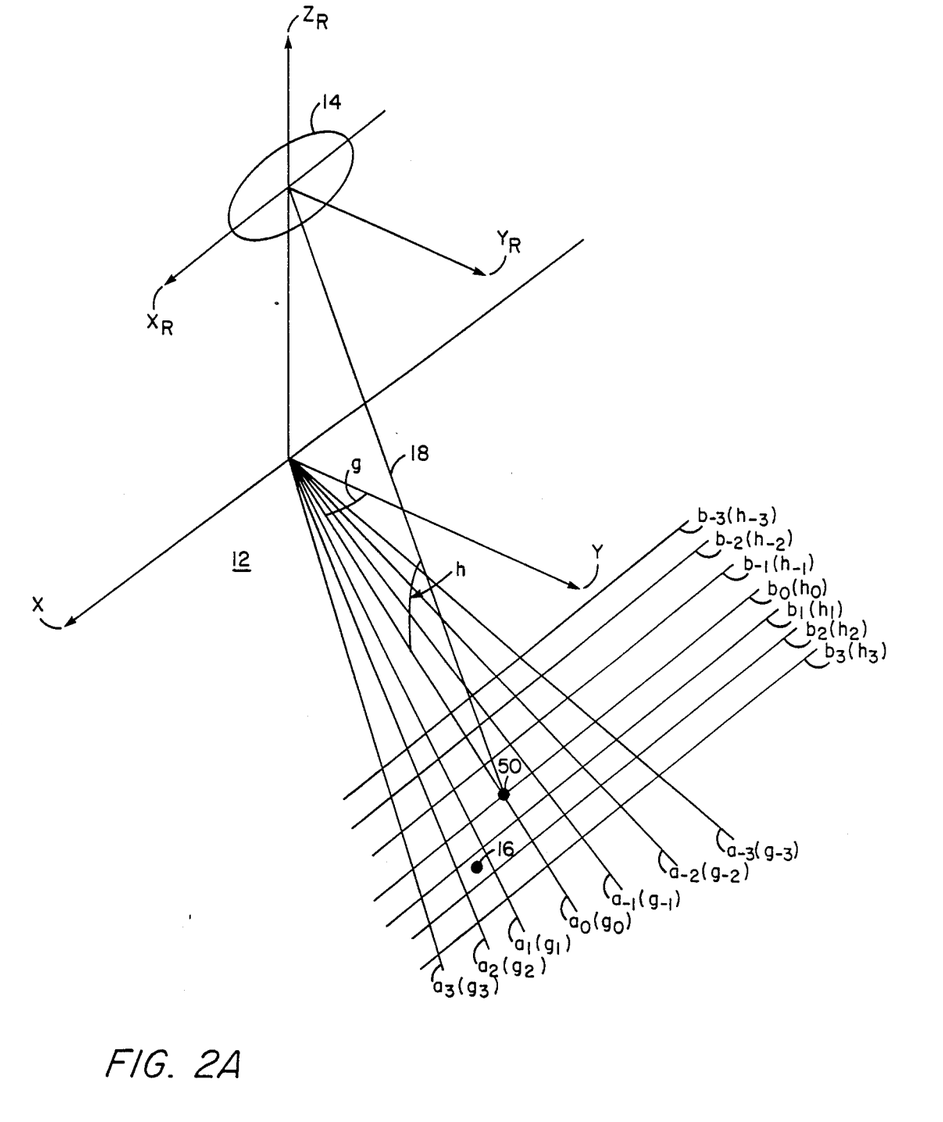
FIG. 2A is a sketch showing additional details of the geometrical relationships between the monopulse antenna of FIG. 1 objects on the ground.

In FIG. 2A monopulse antenna 14 is shown along with the coordinate system relative to aircraft 10 (not shown) and the coordinate system relative to the ground 12. As noted hereinabove, a monopulse antenna produces three signals: A sum signal, here denoted "S", an azimuth difference signal, here denoted $D_a$, and an elevation difference signal, here denoted $D_b$. The S, $D_a$ and $D_b$ signals are the superposition of contributions from each point in the beam coverage area 26 reflecting radar pulses (FIG. 1). Further, the magnitude of each contribution depends on the angular distance of the point from the beam center 50. The ground 12 in FIG. 2A is marked with a grid indicating angular distances from the beam center.

The line $b_0$ represents the set of points where beam center 50 would be if steering angle b were given a constant value of $b_0$ and steering angle a were given values between $-90°$ and $+90°$. Each one of the lines $b_{-3}$, $b_{-2}$, $b_{-1}$, $b_1$, $b_2$ and $b_3$ represenfts a set of points for beam center 50 where steering angle b were given a constant value of $b_{-3}$, $b_{-2}$, $b_{-1}$, $b_1$, $b_2$ or $b_3$, respectively, and steering angle a were given values between $-90°$ and $+90°$. The lines $b_{-3}$...$b_3$ make up a first scale indicative of displacement in elevation of any point. For example, reference point 16 falls between lines $b_1$ and $b_2$ and so has an elevational displacement $b_i$ which is between $b_1$ and $b_2$.

FIG. 2A likewise shows a second scale indicative of displacements in aximuth. The line $a_0$ represents the points where beam center 50 would be if steering angle a had a value of $a_0$ and steering angle b were given values between $-90°$ and $+90°$. The other lines $a_{-3}$...$a_4$ are likewise formed for different values of steering angle a. As an example, reference point 16 falls between lines $a_1$ and $a_2$ and thus has an azimuthal displacement $a_i$ between $a_1$ and $a_2$.

As is known, the S, $D_a$ and $D_b$ signals received by monopulse antenna 14 are of the form $$S = \sum_i A_i \cos^2(K\,da_i)\,\cos^2(K\,db_i)\,T(t-t_i) \quad \text{Eq. (5)}$$

$$Da = \sum_i A_i \cos^2(K\,db_i)\,\cos(K\,da_i)\sin(K\,da_i)\,T(t-t_i) \quad \text{Eq. (6)}$$

$$Db = \sum_i A_i \cos^2(K\,da_i)\,\cos(K\,db_i)\sin(K\,db_i)\,T(t-t_i) \quad \text{Eq. (7)}$$

where
K is the monopulse antenna gain;
$da_i$ is the azimuthal displacement of the $i^{th}$ point minus $a_0$;
$db_i$ is the elevational displacement of the $i^{th}$ point minus $b_0$;
$A_i$ represents the magnitude as received at monopulse antenna 14 of the signal from the $i^{th}$ point in the beam coverage area 26; and
$T(t-t_i)$ is a function representing the radar pulses transmitted at time t and delayed a time $t_i$ by the back and forth propagation delay to the $i^{th}$ point in beam coverage area 26.

Using small angle approximations to for the sines and cosines of Equations 3, 4 and 5, those Equations may be simplified, respectively, as shown in Equations 6, 7 and 8:

$$S = \sum_i A_i\,T(t-t_i) \quad \text{Eq. (8)}$$

$$D_a = \sum_i A_i\,K\,da_i\,T(t-t_i) \quad \text{Eq. (9)}$$

$$D_b = \sum_i A_i\,K\,db_i\,T(t-t_i) \quad \text{Eq. (10)}$$

Figure 2B:
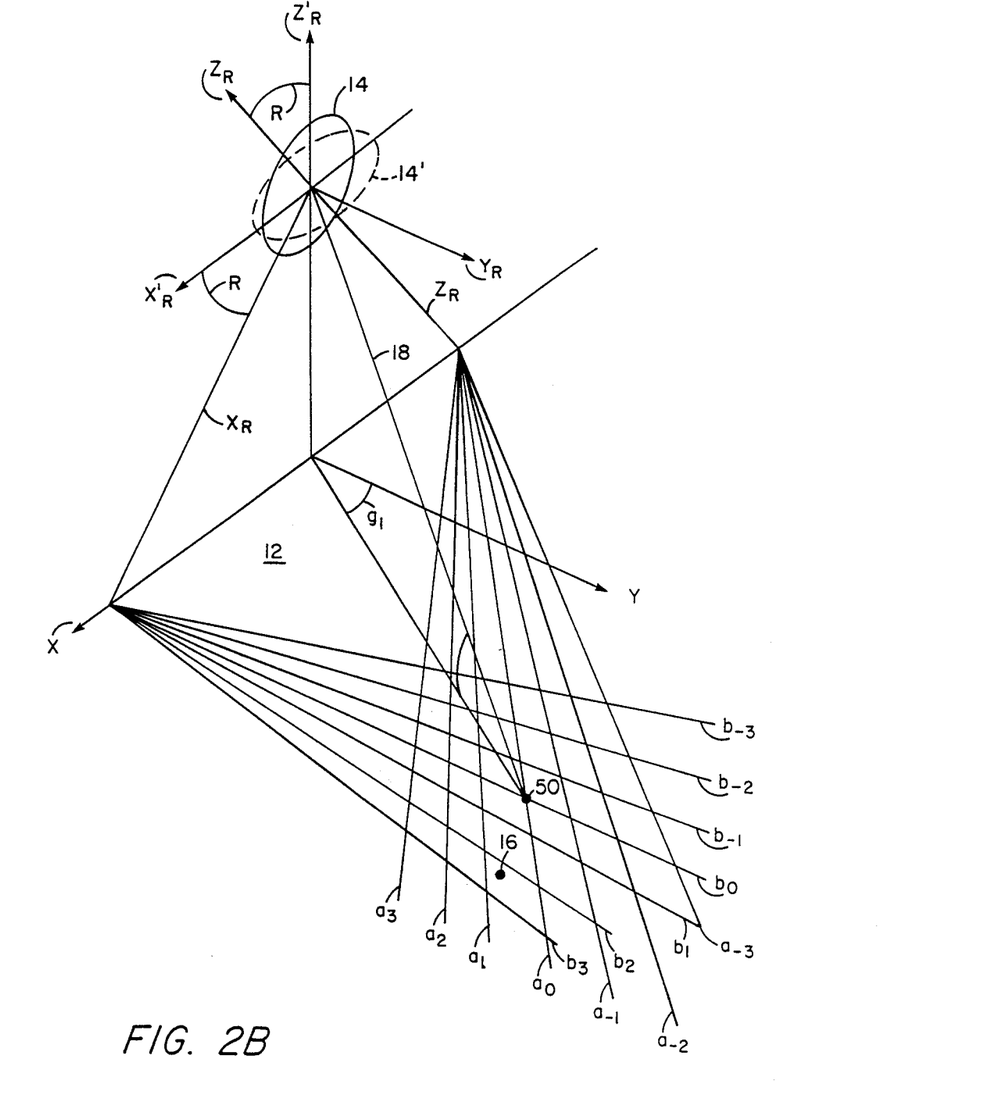
FIG. 2B is a sketch showing the same geometrical relationships as FIG. 2A when the monopulse antenna is rotated 45° from the position shown in FIG. 2A.

The sensitivity of the signals S, $D_a$ and $D_b$ to roll of the aircraft 10 (FIG. 1) can be seen by reference to FIG. 2B. Monopulse antenna 14 is shown rotated R degrees about axis $Y_R$. Thus, the axes $X_R$ and $Y_R$ relative to aircraft 10 (FIG. 1) are rotated R degrees relative to their positions in FIG. 2A, with the fixed reference being ground 12.

For comparison, the positions of monopulse antenna 14, axis $X_R$ and $Z_R$ in FIG. 2A are shown in FIG. 2B as 14', $X_R'$ and $Z_R'$. It is important to note in FIG. 2B that the scale lines $b_{-3}$...$b_3$ and $a_{-3}$...$a_3$ are different in FIG. 2B than in FIG. 2A because of the roll of aircraft 10 (FIG. 1). Reference point 16 has an angular displacement $a_i$, $b_i$. In FIG. 2B, $a_i$ is between $a_0$ and $a_1$, while in FIG. 2A it is between azimuthal displacements $a_1$ and $a_2$. Similarly, reference point 16 has an elevational displacement $b_i$ between $b_2$ and $b_3$ according to the scale of FIG. 2B but between $b_1$ and $b_2$ according to the scale of FIG. 2A.

The changes in the scale for measuring displacement angle effect the values of $D_a$ and $D_b$ as seen in Eq. (9) and Eq. (10). Signal S is not affected because it does not depend on the displacement angles of any points. Thus, it can be seen that rool of aircraft 10 (FIG. 1)—even though monopulse antenna 14 is steered along line 18—changes the values of the signals $D_a$ and $D_b$. Further processing is required to stabilize the signals in the presence of roll.

To determine the required processing, the signals $D_a$ and $D_b$ in Eqs. (9) and (10) may be expressed in terms of angular displacements measured in terms of a scale that does not change as aircraft 10 rolls. Referring again to FIG. 2A, it will be noted that for orientation of monopulse antenna 14 shown, steering angle a equals ground angle g and steering angle b equals ground angle h. Scale lines $g_{-3} \ldots g_3$ coincident with $a_{-3} \ldots a_3$ could have been defined by giving ground angle g values $g_{-3}, g_{-2} \ldots g_3$ equal to $a_{-3}, a_{-2} \ldots a_3$ and allowing ground angle h to vary from $-90°$ to $+90°$. Similarly, scale lines $h_{-3} \ldots h_3$ could be formed by giving ground angle h values equal to $b_{-3}, b_{-2} \ldots b_3$ and varying ground angle g from $-90°$ to $+90°$. Because the scale lines $g_{-3} \ldots g_3$ and $h_{-3} \ldots h_3$ do not depend on roll angle, reference point 16 and all other points in beam coverage area 26 (FIG. 1) will have the same angular displacements if measured against scale lines $g_{-3} \ldots g_3$ and $h_{-3} \ldots h_3$. The monopulse antenna system would be insensitive to roll if compensated difference signals $D_a'$ and $D_b'$ could be based on angular displacements referenced to ground angles g and h. Such signals would be of the form:

$$D_a' = \sum_i A_i K\, dg_i\, T(t - t_i) \quad \text{Eq. (11)}$$

$$D_b' = \sum_i A_i K\, dh_i\, T(t - t_i) \quad \text{Eq. (12)}$$

where
$T(t-t_i)$, $A_i$ and K have the same meanings as in Eq. (7);
$dg_i$ is the azimuthal displacement of the $i^{th}$ point expressed in terms of the ground angle scale minus $g_o$; and
$dh_i$ is the elevational displacement of the $i^{th}$ point expressed in terms of the ground angle scale minus $h_o$.

To be used in a system on aircraft 10 (FIG. 1), however, $D_a'$ and $D_b'$ must be related to $D_a$ and $D_b$ which are produced by monopulse antenna 14 (FIG. 1). Assuming again that the angular displacements $da_i$, $db_i$, $dg_i$ and $dh_i$ are small, an equation relating the quantities may be written:

$$\begin{bmatrix} da_i \\ db_i \end{bmatrix} = \begin{bmatrix} G_{11} & G_{12} \\ G_{21} & G_{22} \end{bmatrix} \begin{bmatrix} dg_i \\ dh_i \end{bmatrix} \quad \text{Eq. (13)}$$

where
$G_{11}$ is a function representing the first derivative of a with respect to g evaluated at $g=0$;
$G_{12}$ is a function representing the first derivative of a with respect to h evaluated at $h=0$;
$G_{21}$ is a function representing the first derivative of b with respect to g evaluated at $g=0$; and
$G_{22}$ is a function representing the first derivative of b with respect to h evaluated at $h=0$.

By reference to Eq. (3) and Eq. (4), $G_{11}$, $G_{12}$, $G_{21}$ and $G_{22}$ may be calculated using known methods.

Equation 13 may also be rewritten, using well known matrix identifies, to solve for $dg_i$ and $dh_i$:

$$\begin{bmatrix} dg_i \\ dh_i \end{bmatrix} = \frac{1}{G_{11}G_{22} - G_{12}G_{21}} \begin{bmatrix} G_{22} & -G_{12} \\ -G_{21} & G_{11} \end{bmatrix} \begin{bmatrix} da_i \\ db_i \end{bmatrix} \quad \text{Eq. (14)}$$

Substituting Equation 14 in Equations 11 and 12 results in:

$$D_a' = \frac{1}{G_{11}G_{22} - G_{12}G_{21}} \sum_i A_i K(G_{22}\, da_i - G_{12}\, db_i) T(t - t_i) \quad \text{Eq. (15)}$$

$$D_b' = \frac{1}{G_{11}G_{22} - G_{12}G_{21}} \sum_i A_i K(-G_{21}\, da_i + G_{11}\, db_i) T(t - t_i) \quad \text{Eq. (16)}$$

By using the expressions for $D_a$ and $D_b$ of Equations 9 and 10, Equation 15 and Equation 16 may be rewritten:

$$D_a' = \frac{1}{G_{11}G_{22} - G_{12}G_{21}} (G_{22} D_a - G_{12} D_b) \quad \text{Eq. (17)}$$

$$D_b' = \frac{1}{G_{11}G_{22} - G_{12}G_{21}} (G_{11} D_b - G_{21} D_a) \quad \text{Eq. (18)}$$

In summary, Equations 17 and 18 describe how to compute difference signals $D_a'$ and $D_b'$ from the measured difference signals $D_a$ and $D_b$. The difference signals $D_a'$ and $D_b'$ have the important property that they are insensitive to roll of aircraft 10 (FIG. 1).

Figure 3:
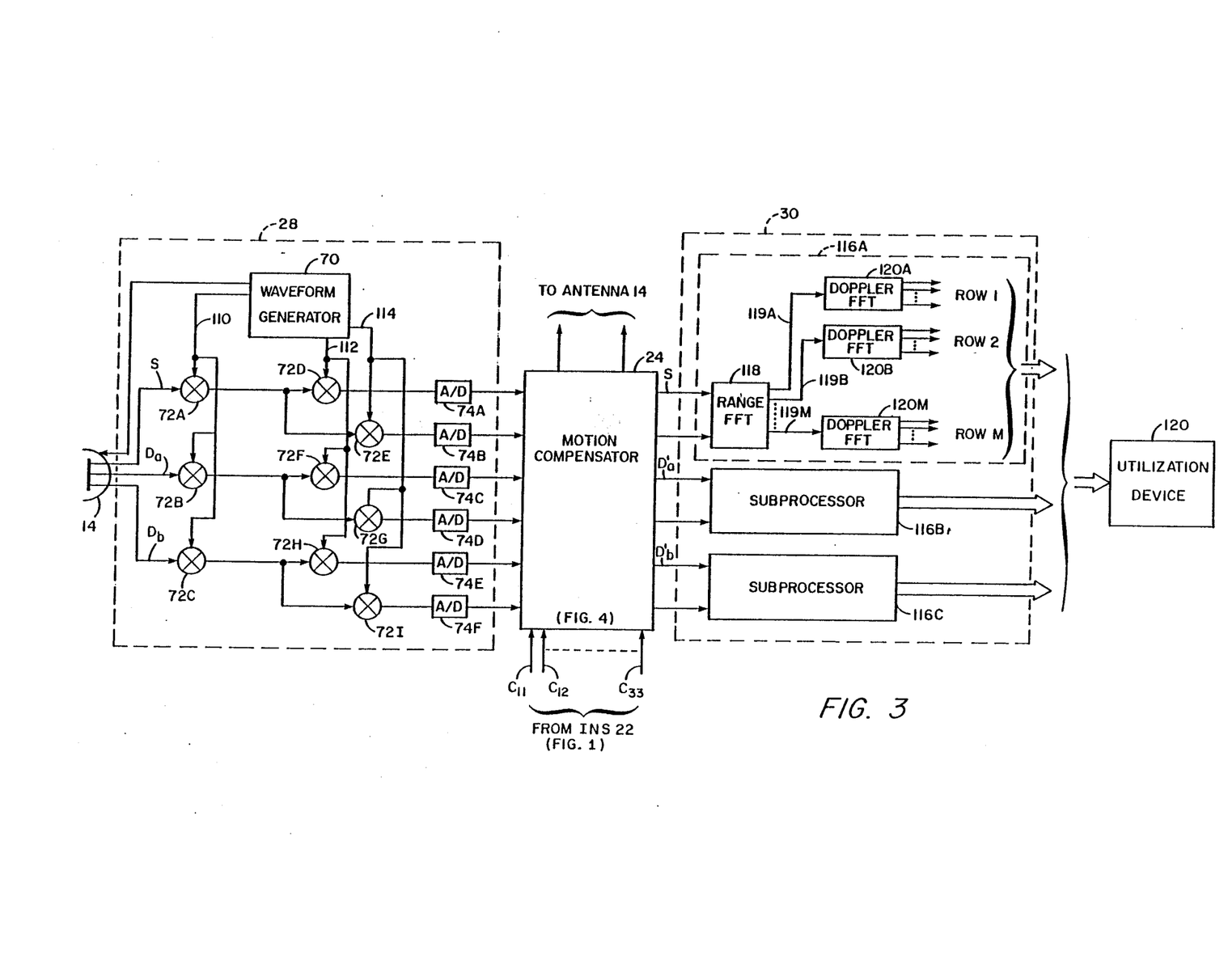
FIG. 3 is a simplified schematic of a synthetic aperture radar (SAR) which processes the signals received by the monopulse antenna mounted on the aircraft shown in FIG. 1.
Figure 5:
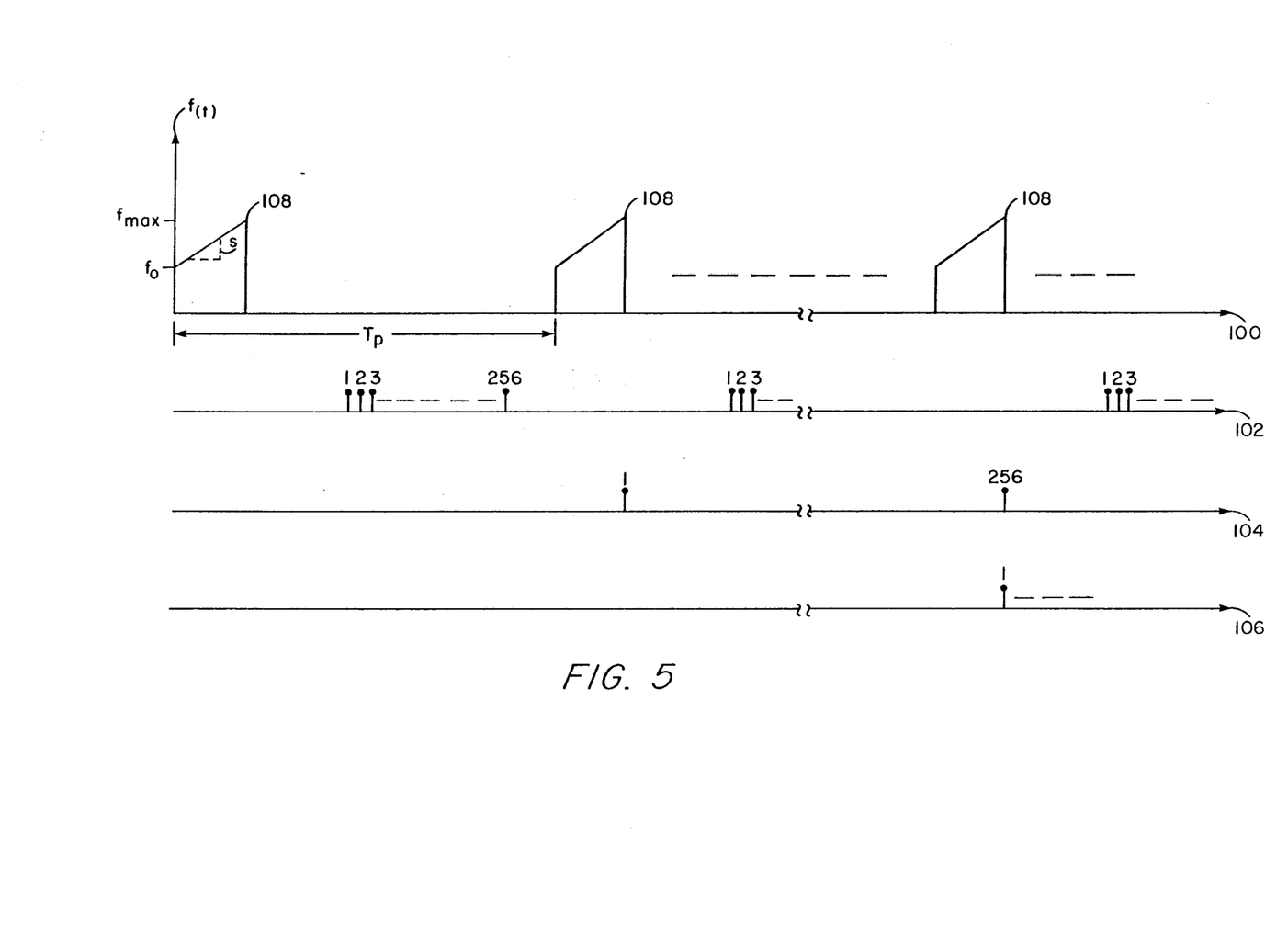
FIG. 5 is a sketch showing time relationships between the operations of the elements of the SAR shown in FIG. 3.

Turning now to FIG. 3, additional details of a SAR utilizing the invention are shown. Waveform generator 70 forms radar pulses using known methods. Time line 100 of FIG. 5 shows that here pulses 108 occur every $T_p$ second. Additionally, each pulse has a frequency, f(t), which changes at a rate s from a frequency $f_o$ to $f_{max}$. One skilled in the art will recognize pulses 108 as "chirped" pulses with a chirp slope s.

Monopulse antenna 14 transmits the pulses from waveform generator 70 and receives reflected pulses. Monopulse antenna 14 may be used to both transmit and receive signals using known methods, such as circulators (not shown).

A sum signal S, an azimuthal difference signal $D_a$ and an elevation difference signal $D_b$ are formed by monopulse antenna 14 that are passed to mixers 72A, 72B and 72C, respectively. The received signals are mixed with mixing signal 110 from waveform generator 70. Mixing signal 110 is a chirped signal also with a chirp slope s. The maximum frequency of mixing signal 110, however, is less than $f_{max}$ (FIG. 5) by an intermediate frequency $f_{IF}$. Each of the signals is then mixed with an in-phase mixing signal 112 and a quadrature phase mixing signal 114 at mixers 72D–72I. In-phase mixing signal 112 is a sinusoidal signal having a frequency of $f_{IF}$. Quadrature phase mixing signal 114 is similar to in-phase mixing signal 112 except delayed in phase by 90°.

The outputs of mixers 72D–72I are converted to digital signals by analog-to-digital converts 74A . . . 74F (hereinafter referred to as "A/D"). Time line 102 in FIG. 5 shows when samples of the analog signals are taken. Here, 256 samples are taken after each pulse is transmitted. As is known, two digital signals (i.e., a complex number) are required to represent an analog signal if the phase of the analog signal is to be preserved. The digitized signals are passed to motion compensator 24 which forms the stabilized signals S, $D_a'$ and $D_b'$ as described in Eq. (17) and Eq. (18( are formed.

The compensated sum signal S, azimuth difference signal $D_a'$ and elevation difference signal $D_b'$ are inputs to subprocessors 116A, 116B and 116C, respectively, of SAR processor 30. Details of subprocessor 116A operating on the sum signals are shown as representative of the subprocessors 116A, 116B and 116C.

The sum signal S is the input to FFT processor 118. Here, FFT Processor 118 performs a complex 256 point FFT. Circuitry for performing such functions is known. As indicated on time line 104 in FIG. 5, one set of outputs of FFT processor 118 is produced after 256 samples from A/Ds 74A-74F which means one set of outputs for each pulse 108 (FIG. 5).

A little though reveals that FFT processor 118 operates as a filter which divides up the signals representing the reflected pulses based on the range between the reflecting point and aircraft 10 (FIG. 1). This result can be seen by considering the radar pulse reflected from one point in the beam coverage area 26 (FIG. 1). The reflected pulse has a chirp slope s, as does the mixing signal 110. Thus, the frequency of the signals produced by mixer 72A will always be a constant (i.e., the difference between two values increasing at the same rate is a constant). However, the exact frequency of the signal from mixer 72A depends on how long it takes the radar pulse to travel down to ground 12 (FIG. 10) and reflect back (i.e., the range since propagation delay is directly related to distance). As is known, an FFT processor acts as a bank of bandpass filter with each output reflecting the magnitude of the frequency components in a particular frequency range in the input signal. The input to FFT processor 118 is a superposition of components representing reflections from numerous reflecting points, with the frequency of each reflection related to the range of a particular reflecting point. Therefore, in acting as a bank of bandpass filters to sort the reflections by frequency, FFT processor 118 also sorts reflections by range.

Each of the outputs of FFT processor 118 (representing the reflections from points a given range from the aircraft 10 (FIG. 1)) is fed to a second FFT processor 120A . . . 120M. As is known, there is a Doppler shift in frequency of the reflected pulses due to the motion of aircraft 10 (FIG. 1) with respect to points on the ground 12 (FIG. 1). Further, the magnitude of Doppler shift depends on the angular distance between the reflecting point and the direction of travel of aircraft 10. Thus, by acting as a bank of bandpass filters, each of the FFT processors 120A . . . 120M is actually sorting reflections based on angular distance from the line of travel of aircraft 10. The outputs of FFT processors 120A . . . 120M here are shown to form M rows of the SAR map. As shown on time line 106 of FIG. 5, one SAR map is formed for every 256 pulses.

The SAR map produced by subprocessor 116A is fed to utilization device 120. Similarly, the SAR maps produced by subprocessors 116B and 116C are fed to utilization device 120. As is known, the three SAR maps provide more information about objects in beam coverage area 26 (FIG. 1) than a single SAR map would provide. Here, utilization device 120 might be a known device to form photograph-like images of beam coverage area 26 (FIG. 1). Alternatively, utilization device 120 could be a computer programmed to process the SAR maps to identify objects and then steer aircraaft 10 (FIG. 1) based on what objects are in beam coverage area 26 (FIG. 1).

Figure 4:
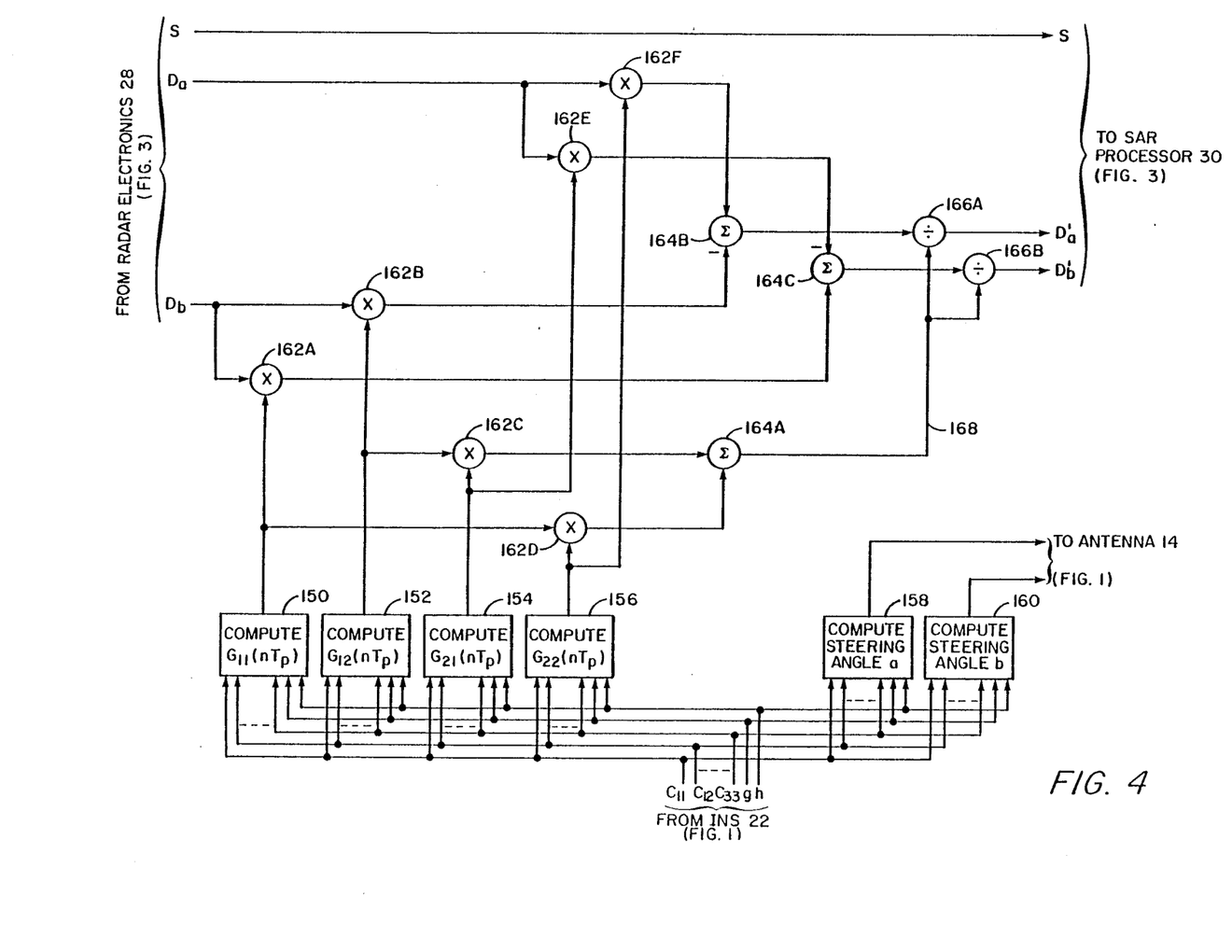
FIG. 4 is a functional block diagram showing the processing performed by the motion compensator of FIG. 3.

Turning now to FIG. 4, additional details of motion compensator 24 are shown. Motion compensator 24 is constructed from a digital computer programmed to perform the functions described below. Alternatively, digital circuitry could be constructed to perform the same functions.

It will be noted that SARs often contain circuitry to compensate received signals to account for the fact that the aircraft 10 (FIG. 1) is flying with a given velocity along the axis $Y_R$ (FIG. 1) relative to ground 12 (FIG. 1). Because that aspect of motion compensation is well known, it is not described here. Motion compensator 24 here is shown only to correct for motion of aircraft 10 (FIG. 1) due to roll, pitch and yaw.

INS 22 (FIG. 1) provides the coefficients $C_{11} \ldots C_{33}$ of the translation matrix C to processing blocks 150, 152, 154, 156, 158 and 160. Additionally, INS 22 (FIG. 1) provides a representation of the desired ground angles g and h.

Based on the input from INS 22 (FIG. 1), processing block 158 computes steering angle a using Equation 3. Likewise, processing block 160 computes steering angle b using Equation 4. The commands needed to steer monopulse antenna 14 with the angles a and b are computed and provided to monopulse antenna 14 (FIG. 1). The translation matrix C will change as aircraft 10 (FIG. 1) rolls, pitches and yaws. To compensate for the motion, processing blocks 158 and 160 repetitively compute the steering angles a and b.

Processing blocks 150, 152, and 156 compute the values of $G_{11}$, $G_{12}$, $G_{21}$ and $G_{22}$, respectively. Those quantities may be computed as described in conjunction with Eq. 11. The vaues of $G_{11}$, $G_{12}$, $G_{21}$ and $G_{22}$ depend on the values of the translation matrix C which may change constantly. However, values of $G_{11}$, $G_{12}$, $G_{21}$ and $G_{22}$ do not have to be recomputed for every change in translation matrix C if the changes are small. As shown in time line 102 (FIG. 5) after each pulse 108, 256 samples are taken in quick succession and the change in translation matrix C is small while the 256 samples are taken. Thus, processing blocks 150, 152, 154 and 156 compute values of $G_{11}$, $G_{12}$, $G_{21}$ and $G_{22}$ once for each transmitted radar pulse.

The values of $G_{11}$, $G_{12}$, $G_{21}$ and $G_{22}$ are inputs to multiples 162A . . . 162F. The monopulse difference signals $D_a$ and $D_b$ are also inputs to multiplies 162A . . . 162F. As noted on time line 102 in FIG. 5, 256 samples of the monopulse signals are taken for each pulse. Multipliers 162A . . . 162F form a new output for every sample. It should also be noted that the monopulse difference signals $D_a$ and $D_b$ are complex numbers represented by two digital values and multipliers 162A . . . 162F are complex multipliers of known construction.

The outputs of multipliers 162A . . . 162F are inputs to summers 164A . . . 164C. It should be noted that one input to each of the summers 164A . . . 164C is marked "−". The signals at the marked inputs are negated in any known, but not shown, manner before addition such that summers 164A . . . 164C actually perform a subtraction. Summers 164A . . . 164C operate on complex quantities and are of known construction.

The outputs of summers 164A . . . 164C are inputs to dividers 166A and 166B. Signal 168, forming one input to dividers 166A and 166B, is divided into the other input to each divider 166A and 166B to produce the compensated monopulse signals $D_a'$ and $D_b'$. Dividers 166A and 166B operate on complex numbers and are of known construction.

A little thought will reveal that the processing shown in FIG. 4 solves Equations 15 and 16. Additionally, the processing solves Equations 3 and 4. Therefore, monopulse antenna 14 (FIG. 1) is stablized for roll, pitch and yaw of aircraft 10 (FIG. 1) electronically.

Having described a preferred embodiment of this invention, it will be apparent to one of skill in the art that many changes and modifications maay be made without departing from my inventive concepts. For example, the invention might be used to stabilize monopulse antennas in systems other than the SAR described herein. It is felt, therefore, that this invention should not be restricted to its disclosed embodiments, but rather should be limited only by the spirit and scope of the appended claims.

What is claimed is:

1. A method of forming a compensated sum signal, a compensated azimuthal difference signal, and and a compensated elevation difference signal to electronically stabilize a beam from a monopulse antenna carried in a moving body, such beam being electronically steerable in a first direction and a second direction in a first coordinate system relatively to the monopulse antenna to coincide with a line fixed in relation to a second coordinate system, such monopulse antenna producing a sum signal, an azimuthal difference signal, and an elevation difference signal, the method comprising the steps of:

(a) electronically steering the beam in the first direction and the second direction an amount sufficient to compensate for motion of the moving body in the first direction;
   (b) using the sum signal as the compensated sum signal;
   (c) computing a plurality of coefficients relating:
      (i) deviations of the line relative to the second coordinate system expressed in terms of the second coordinate system; and
      (ii) deviations of the line relative to the second coordinate system expressed in terms of the first coordinate system; and
   (d) forming a compensated azimuthal difference signal and a compensated elevation difference signal by adding the azimuthal difference signal and elevational difference signal each weighted by a combination of the plurality of coefficients.

2. The method of electronically stabilizing a monopulse antenna as in claim 1 wherein the compensated azimuthal difference signal and compensated elevation difference signal are used to form a synthetic aperture radar map.

3. The method of electronically stabilizing a monopulse antenna as in claim 1 wherein:
   (a) the moving body is an aircraft flying above the ground; and
   (b) the second coordinate system is fixed in relation to the ground.

4. The method of forming compensated signals of claim 1 wherein:
   (a) the first direction is pitch of the aircraft; and
   (b) the second direction is yaw of the aircraft.

* * * * *